May 29, 1956 J. MORKOSKI 2,747,487
TRACTOR MOUNTED PLOW
Filed April 20, 1953 3 Sheets-Sheet 1

INVENTOR
JAMES MORKOSKI
Paul O. Pippel
ATTORNEY

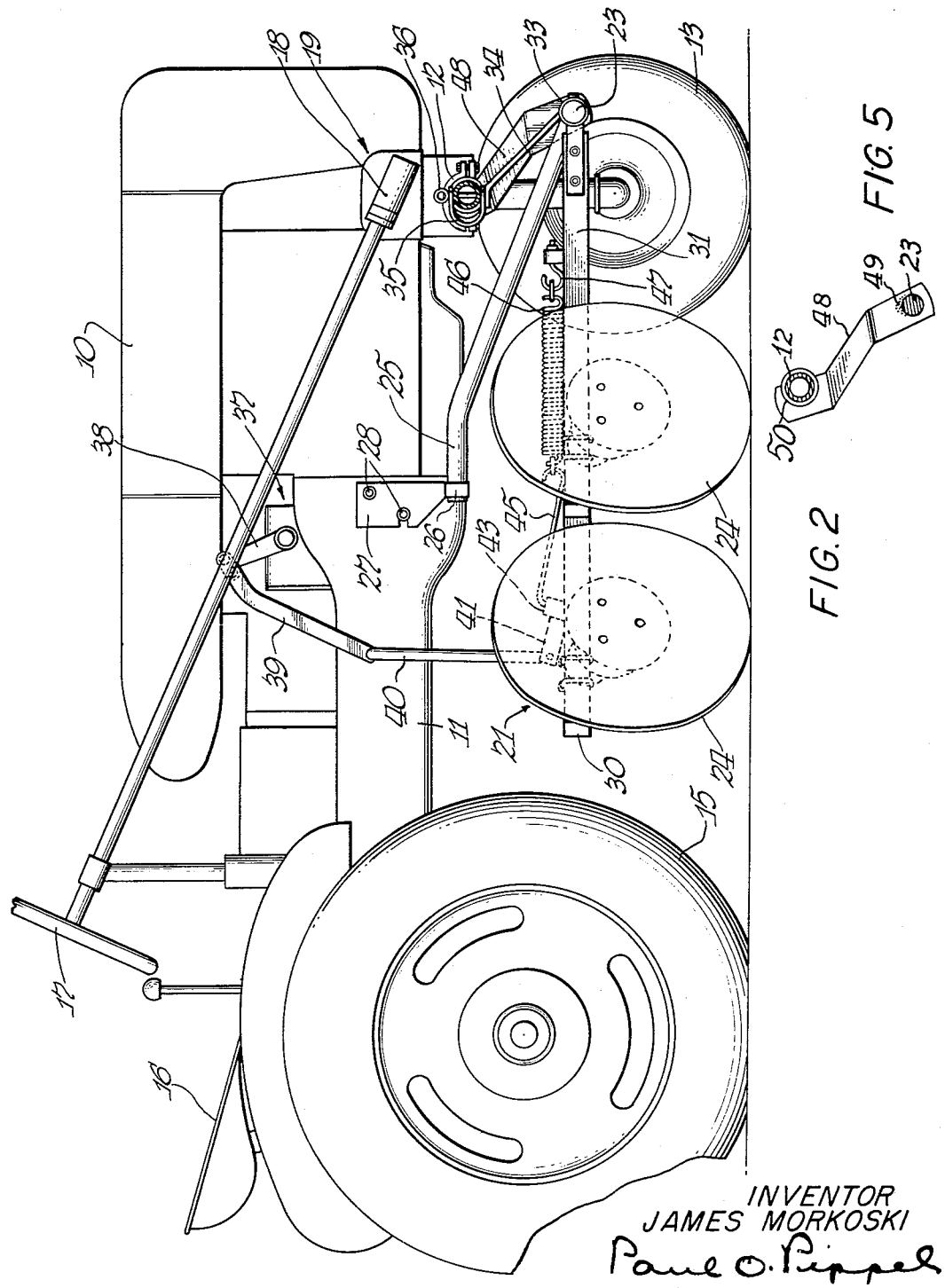

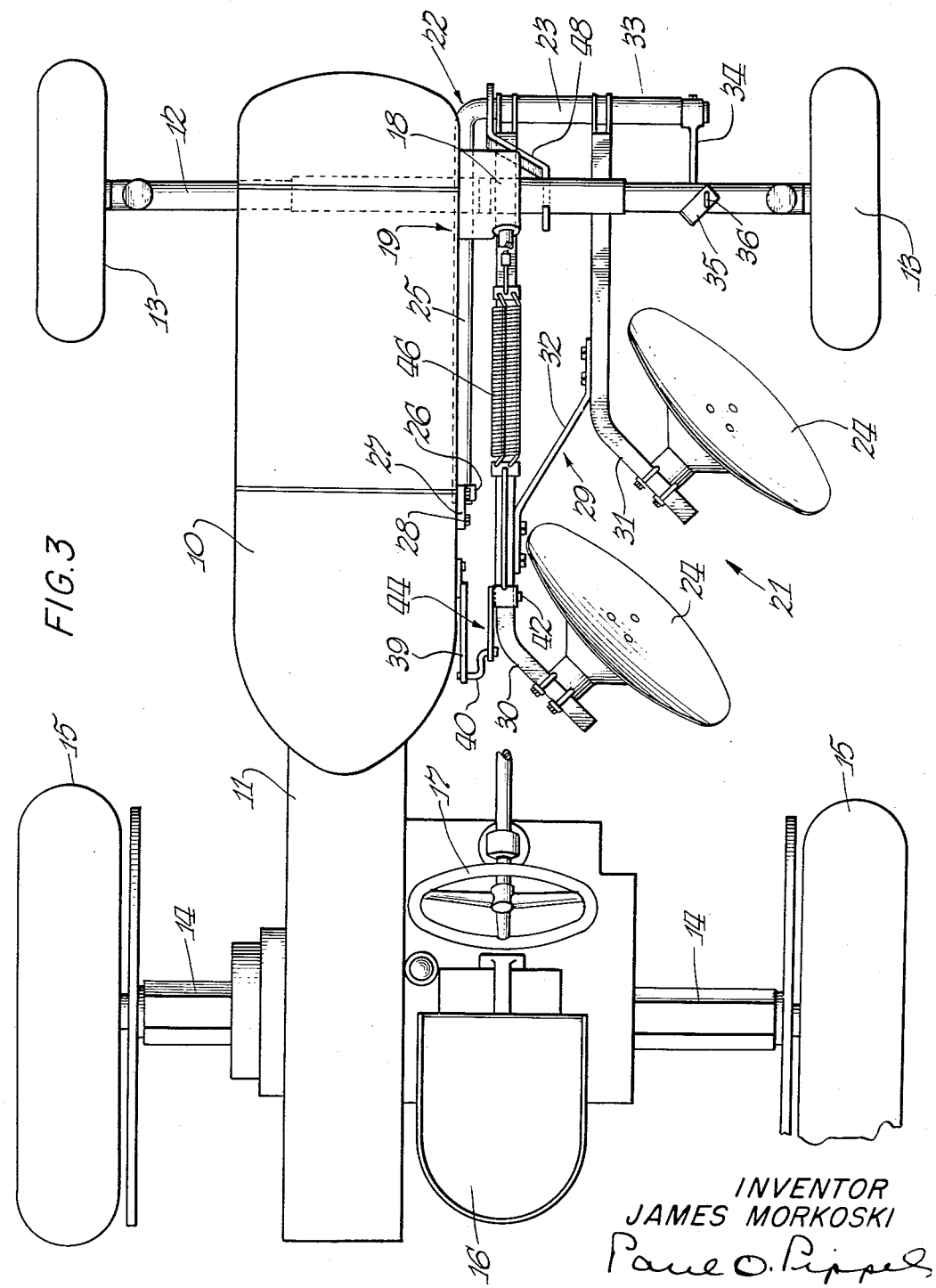

United States Patent Office 2,747,487
Patented May 29, 1956

2,747,487

TRACTOR MOUNTED PLOW

James Morkoski, Memphis, Tenn., assignor to International Harvester Company, a corporation of New Jersey Application April 20, 1953, Serial No. 349,713

4 Claims. (Cl. 97—47.37)

This invention relates to agricultural implements, and particularly to an implement adapted to be mounted upon a tractor to be transported thereon. More specifically, the invention concerns tillage tools, such as a disk plow.

An object of the invention is the provision of a tractor-mounted disk plow or the like having novel means for attaching the implement to the tractor to be controlled therefrom.

Another object of the invention is the provision of a tractor-mounted implement adapted to be attached to the tractor in advance of the rear wheels thereof and in view of the tractor operator, wherein novel means are provided for attaching the implement to the tractor and for controlling the operation thereof.

A further object of the invention is the provision of novel means for gauging and otherwise controlling the operation of a tractor mounted implement, such as a disk plow.

Other objects and advantages of the invention will become clear from the following detailed description when read in conjunction with the accompanying drawings, wherein:

Fig. 2 is a view in side elevation of a tractor showing the manner in which the implement is attached to the tractor and gauged therefrom, as well as the lifting mechanism by which the implement is vertically moved between operating and transport positions;

Fig. 3 is a plan view of the structure shown in Fig. 2;

Fig. 5 is a sectional view showing a brace for the implement.

Figure 1:
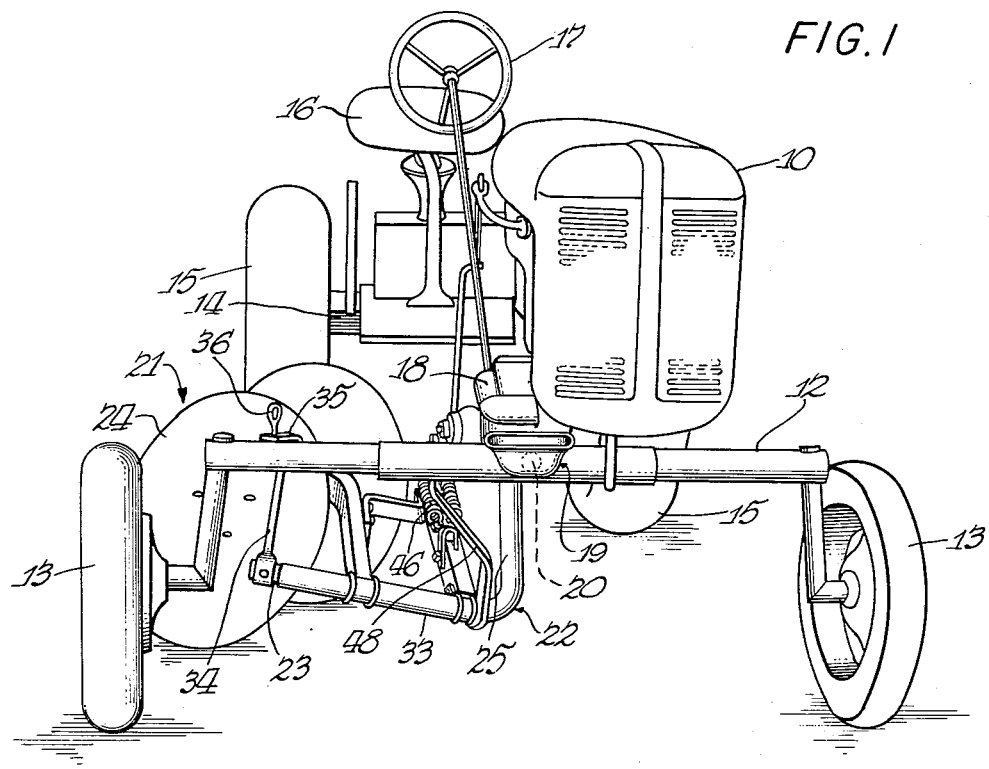
Fig. 1 is a front view in perspective of a tractor having mounted thereupon an agricultural implement embodying the features of this invention, and with parts removed for clarity.
Figure 4:
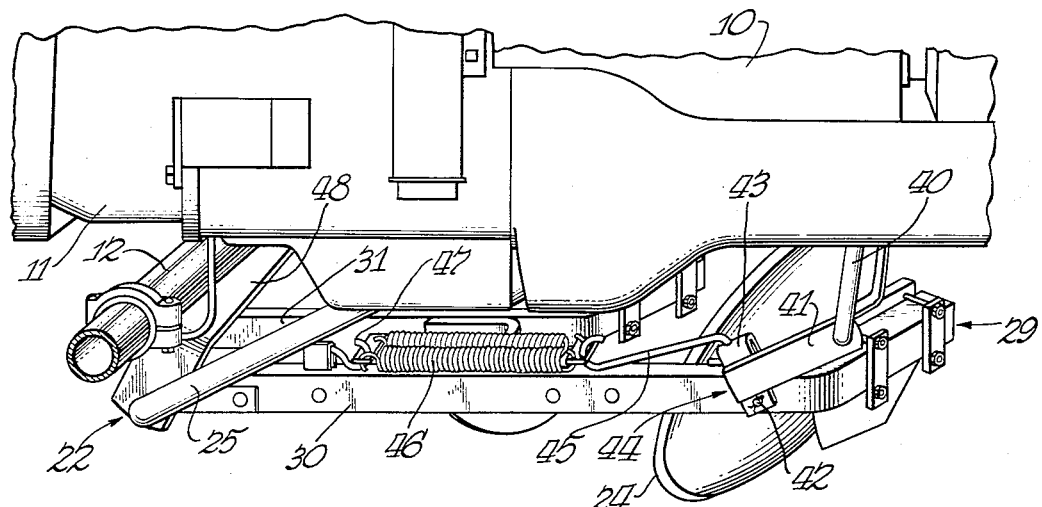
Fig. 4 is an enlarged detail in perspective showing a part of the lifting linkage and cushioning and pressure mechanism for the disk plow.

Referring to the drawings, the numeral 10 designates the longitudinally extending, laterally offset body of a tractor having a power plant 11, a front axle structure 12 supporting laterally spaced and depending dirigible front wheels 13, and a rear axle structure 14 supporting laterally spaced rear drive wheels 15. The tractor is of a conventional and well-known type provided with an operator's station 16, a steering wheel 17 connected to a steering gear housing 18 for connection in a suitable manner, not shown, to the front wheels 13. This steering gear housing 18 forms a part of a front wheel supporting structure 19 which is provided with a central pivot 20, extending longitudinally of the tractor, upon which the central portion of the transverse front axle structure 12 is pivotally mounted for swinging in a vertical plane to permit the tractor to adapt itself to variations in ground contour encountered by the front wheels 13.

The implement of the present invention is a two-furrow disk plow 21 which includes a draft member 22, having a transversely extending portion 23 below and somewhat in advance of the front axle structure 12 at one side of the tractor body. In the operating position of the implement with the disks 24 penetrating the ground, the transverse portion 23 approaches nearer to parallelism with the axle structure 12. The draft member 22 is likewise provided with a part 25 bent rearwardly at right angles to the part 23 and having its horizontal rear end pivotally received in a bearing 26 at the lower end of a bracket 27 removably affixed by bolts 28 to the side of the tractor body. By virtue of the pivotal mounting of the rear horizontal end of portion 25 of the draft member 22, this member is capable of pivoting about the bearing 26 as an axis. The bearing 26 is substantially coaxial with the pivot 20 of the front axle structure 12 on the tractor, for a reason which will hereinafter become apparent.

A tool-carrying frame 29 forms a part of the implement of this invention and includes longitudinally and laterally spaced beams 30 and 31 upon the rear ends of which are mounted the disks 24. The rear ends of these beams are connected by a brace 32 and the forward ends are mounted upon a sleeve 33 rockably mounted on the transverse portion 23 of the draft member 22, so that the tool carrier 29 is capable of vertical swinging about the axis of the transverse portion 23. At this point it should be clear that the implement 21, by virtue of the pivotal mounting of the draft bar 22 in the bearing 26, is also capable of vertical movement about this central axis.

The outer end of the transverse portion 23 of the draft member 22 has secured thereto a depending strap 34, the upper end of which is secured to a yoke 35 which is pivotally mounted by means of a pin 36 upon the outer end of the front axle structure 12 at one side of the pivot axis 20 thereof and having an eye for easy removal. Therefore, since the bearing 26 is on a substantially common axis with the pivot point 20 of the front axle structure 12, the implement is capable of partaking of the movement of the front axle structure 12 in a vertical plane about said pivot in response to changes in the contour of the ground traversed by the tractor. The depth of operation of the earth-working tools 24 is thus gauged from the right-hand front tractor wheel 13 so that the operation of the implement is uniform.

Vertical movement of the implement 21 between operating and transport positions is accomplished by power lift mechanism on the tractor designated at 37, preferably of the hydraulically operated type and including a rock arm 38 rocked by power derived from the mechanism 37 and under the control of the tractor operator. Arm 38 has secured thereto a link 39 which, in turn, has pivotally connected to its lower end the upper end of a lifting link 40, the lower end of which is pivotally connected to a bell crank 41 pivoted upon a pin 42 carried by the beam 30 near its rear end. An arm 43 of the bell crank, designated generally by the numeral 44, is connected by another link 45 to one end of a double spring unit 46, the forward end of which is anchored to a hook 47 secured to the forward portion of the beam 30. Rocking of the arm 38 in a clockwise direction, as viewed in Fig. 2, raises the tool carrier 29 about the pivotal connection thereof to the draft member 22. The implement is thus under control of the operator from his station 16 at all times and is stabilized and gauged by the tractor through the connection thereof to the front axle structure 12.

In the operating position of the implement, the latter is capable of limited vertical floating movement about the connection of the tool carrier to the draft member by virtue of the connection of the lifting link 40 to bell crank 44 and the spring 46. The forward end of the implement moves vertically as a unit with the front axle structure 12 as it pivots about the axis 20, and this is made possible by the fact that the horizontal portion 25 of the draft member 22 is mounted on the tractor on an axis substantially coincident with the pivot 20 of the front axle structure.

In order to remove the implement from the tractor, the link 39 is disconnected from the arm 38 and the bracket 27 is removed by loosening the bolts 28. The implement may then be swung laterally outwardly away from the tractor body about the pivot of the pin 36 on the outer end of the front axle structure 12. This may be accomplished by backing up the tractor, causing the plow to swing away from the tractor, and upon removing the pin 36 connecting the strap 34 to the front axle structure, the tractor can be driven forward and away from the plow so that a minimum of manual labor is required in its removal. Attaching the plow is accomplished by reversing these operations.

In addition to accommodating the vertical floating movement of the rear end of the tool carrier during operation, the spring unit 46 serves with the bell crank 44 as a constant pressure device tending to exert a downward pressure to hold the implement in the ground. The attachment of the disk plow to the tractor at a hitch point at the very front of the tractor allows the plow to jump over obstructions, and since the plow is stabilized and gauged from the tractor front axle, excessive variations in plowing depth and the tendency under certain circumstances to dig too deeply in the ground is avoided.

Additional strength is provided in the connection of the implement to the tractor by the provision of a brace 48 which is affixed at its lower end by welding indicated at 49 to the inner end of the transverse portion 23 of the draft member 22, and the upper end thereof is provided with a recess or open ended slot 50 adapted to receive and partly embrace the front axle structure 12, as shown in Figure 5, at a location laterally spaced from the strap 34. In operation this brace 48 functions to strengthen the plow particularly against vertical stresses while at the same time accommodating easy removal of the plow by allowing it to swing laterally away from the tractor when the bracket 27 and the link 39 are disengaged therefrom. Conventional supporting means, not shown, may be provided to prevent the implement from falling when removed from the tractor.

It is believed that the operation of the improved tractor mounted disk plow of this invention will be clearly understood from the foregoing description. It likewise should be understood that modifications may be made in the invention without departing from the spirit thereof or the scope of the appended claims.

What is claimed is:

1. For use with a tractor having a transverse wheel-carrying axle structure pivotally mounted on a central horizontal axis for floating movement of the wheeled ends of the axle structure in a vertical plane about said pivot axis: an agricultural implement comprising a draft member having a transverse portion adjacent and generally parallel to the axle structure at one side of said axis and a longitudinally extending portion pivotally mounted in draft-transmitting relation on the tractor on a horizontal axis substantially in alignment with the pivot axis of said axle structure, means connecting the transverse portion of the draft member to the axle at a location spaced from the latter's pivot axis to accommodate floating movement of said draft member in a vertical plane with the axle structure, and an earth-working tool-carrier mounted on the transverse portion of said draft member.

2. The invention set forth in claim 1, wherein the means for pivotally mounting the longitudinally extending portion of the draft member on the tractor is a member removable therefrom to disconnect the implement from the tractor, and wherein the connecting means between the draft member and the axle includes a vertical pivot accommodating lateral swinging of the implement away from the tractor about said vertical pivot.

3. The invention set forth in claim 2, wherein a rigid brace is provided between the transverse portion of the draft member and said wheel axle structure in addition to said first mentioned connecting means to brace the draft member against vertical stresses in operation while accommodating said lateral swinging of the implement.

4. The invention set forth in claim 3, wherein said brace is provided with an open-ended slot to receive the axle structure and brace the draft member against vertical stresses in operation while accommodating said lateral swinging of the implement away from the tractor upon removal of said removable member from the tractor.

References Cited in the file of this patent

UNITED STATES PATENTS

| | | |
|---|---|---|
| 1,442,562 | Ferguson | Jan. 16, 1923 |
| 1,671,507 | Boldt | May 29, 1928 |
| 1,729,639 | Altgelt | Oct. 1, 1929 |
| 1,776,242 | Altgelt | Sept. 23, 1930 |
| 1,873,749 | Flanagan | Aug. 23, 1932 |
| 2,349,343 | Graham | May 23, 1944 |